United States Patent [19]

Pagdin

[11] Patent Number: 4,617,904
[45] Date of Patent: Oct. 21, 1986

[54] AIR/FUEL INDUCTION SYSTEM FOR A MULTI-CYLINDER INTERNAL COMBUSTION ENGINE

[75] Inventor: Brian C. Pagdin, Dunstable, England

[73] Assignee: Solex (U.K.) Limited, United Kingdom

[21] Appl. No.: 555,481

[22] Filed: Nov. 28, 1983

[30] Foreign Application Priority Data

Dec. 1, 1982 [GB] United Kingdom ............... 8234310
Dec. 13, 1982 [GB] United Kingdom ............... 8235448

[51] Int. Cl.$^4$ ........................................... F02M 39/00
[52] U.S. Cl. ..................................... 123/525; 123/527
[58] Field of Search ............... 123/525, 526, 527, 1 R, 123/452, 472

[56] References Cited

U.S. PATENT DOCUMENTS

| | | | |
|---|---|---|---|
| 3,001,757 | 9/1961 | Ball | 123/472 |
| 3,664,315 | 5/1972 | Kramer | 123/525 |
| 3,742,920 | 7/1973 | Black | 123/472 |
| 4,032,755 | 6/1977 | Bard et al. | 235/92 CC |
| 4,200,064 | 4/1980 | Engele | 123/472 |
| 4,421,087 | 12/1983 | Schuurman | 123/458 |
| 4,430,978 | 2/1984 | Lewis | 123/527 |
| 4,450,821 | 5/1984 | Venning | 123/525 |

FOREIGN PATENT DOCUMENTS

| | | | |
|---|---|---|---|
| 0034076 | 8/1981 | European Pat. Off. | 123/472 |
| 2188059 | 1/1974 | France | 123/472 |
| 2349741 | 11/1977 | France | 123/525 |
| 2355164 | 1/1978 | France | 123/472 |
| 2431031 | 2/1980 | France | 123/472 |
| 2472664 | 7/1981 | France | 123/525 |
| 8100282 | 2/1981 | PCT Int'l Appl. | 123/525 |
| 1374229 | 11/1974 | United Kingdom | 123/472 |
| 2014336 | 8/1979 | United Kingdom | 123/525 |
| 2027941 | 2/1980 | United Kingdom | 123/472 |
| 1581153 | 12/1980 | United Kingdom | 123/472 |
| 2053511 | 2/1981 | United Kingdom | 123/472 |

Primary Examiner—Carl Stuart Miller
Attorney, Agent, or Firm—Parkhurst & Oliff

[57] ABSTRACT

A motor vehicle fuel system operable selectively to supply metered quantities of petrol or LPG in its gaseous state to a carburetter induction passage. The LPG system includes a pair of digital injection valves in a body having a common inlet, a common outlet and an outlet chamber into which the gaseous LPG is injected alternately by the two valves. The metered pulsed outputs of the two valves collected in the outlet chamber is conveyed as a single gaseous fuel supply to the carburetter induction passage. The injection valves can be located spaced from the carburetter whereby to avoid excessive heating. An electronic control unit including a microprocessor and a data store matrix responds to certain engine operating conditions, including engine speed and engine loading, and controls alternate operation of the valves in synchronism with the engine ignition firing sequence. Under certain conditions one of the valves may open before the other closes.

12 Claims, 9 Drawing Figures

AIR/FUEL INDUCTION SYSTEM FOR A MULTI-CYLINDER INTERNAL COMBUSTION ENGINE

This invention relates to an air/fuel induction system for a multi-cylinder internal combustion engine, comprising an air/fuel induction passage, a driver-operable throttle valve in the induction passage for controlling flow of air/fuel mixture to cylinders of the engine and a gaseous fuel system comprising a gaseous fuel injection valve, gaseous fuel supply means operable to supply gaseous fuel to the injection valve, and electrical control means responsive to certain operating conditions of the engine and operable to control operation of said fuel injection valve in accordance with those conditions whereby said fuel injection valve emits a metered output of gaseous fuel which is directed to a location in the induction passage for presentation to a stream of air flowing through the induction passage at that location.

WO No. 81/00282 discloses an arrangement for use in conversion of an internal combustion engine, which was originally constructed for operation on petrol, to operation on liquefied petroleum gas either solely or as a dual fuel system. It includes injection valves which are designed to inject liquefied petroleum gas in the liquid state directly into an inlet air stream to the engine. The injection valves are operable alternately under the control of an electrical control unit which receives signals representative of engine induction air flow rate and engine speed. The same system may also be used if there is only high pressure vapour (at gas bottle pressure) fed to the injection valves.

EP-A-0084219 describes a system in which gaseous fuel is supplied to a single injection valve at a regulated superatmospheric pressure. The injection valve is spaced from the carburetter. The metered, pulsed output of the single injection valve is piped as a single supply to the carburetter induction passage for presentation to air flow to the engine.

The injection valve can be situated spaced from the engine to avoid excessive heating because it is not mounted to inject directly into the carburetter induction passage as proposed in WO No. 81/00282. Furthermore, it is easier to connect a single supply of gaseous fuel to a carburetter induction passage when converting an engine to operation on gaseous fuel than it is to fit a plurality of gaseous fuel injection valves so that they inject directly into the air flow to the engine as proposed in WO No. 81/00282.

The fuel injection valve of the system disclosed in EP-A-0084219 may be an analogue valve or a digital valve which is an on/off valve which is operable to control gaseous fuel flow by opening and shutting a respective orifice, the quantity of gaseous fuel injected by such a digital valve being determined by the frequency of opening and the duration of each opening of the orifice. A digital valve is preferred but fuel distribution difficulties follow from its use because it is difficult to synchronise operation of such a digital valve with the ignition firing sequence of a multi-cylinder engine. These difficulties are acknowledged in general terms in EP-A-0084219 and certain measures aimed at compensating for such non-synchronism are described.

An object of this invention is to avoid the difficulties of the prior art proposals discussed above.

According to this invention there is provided an air fuel induction system for a multi-cylinder internal combustion engine comprising an air/fuel induction passage, a driver-operable throttle valve in the induction passage for controlling flow of air/fuel mixture to cylinders of the engine and a gaseous fuel system comprising a plurality of on/off injection valves each operable to control gaseous fuel flow by opening and shutting a respective orifice, the quantity of gaseous fuel injected by each valve being determined by the frequency of opening and the duration of each opening of the orifice, gaseous fuel supply means operable to supply gaseous fuel to the injection valves, and electrical control means responsive to certain operating conditions of the engine and operable to control operation of said on/off injection valves in accordance with those conditions so that they are operated sequentially and in synchronism with operation of the engine whereby each of said on/off injection valves emits a metered, pulsed output of gaseous fuel which is presented to a stream of air flowing through the induction passage, wherein there is provided a common outlet chamber into which all said on/off injection valves are adapted to inject their metered, pulsed output of gaseous fuel, and a conduit by which said common outlet chamber is in conduit communication with said air/fuel induction passage whereby the separate metered, pulsed outputs of gaseous fuel injected into said common outlet chamber sequentially by said plurality of on/off injection valves are collected in said common outlet chamber and are fed to said air/fuel induction passage by said conduit as a single supply of gaseous fuel.

A dual fuel system in which this invention is embodied is described now by way of example with reference to the accompanying drawings of which:

Figure 1:
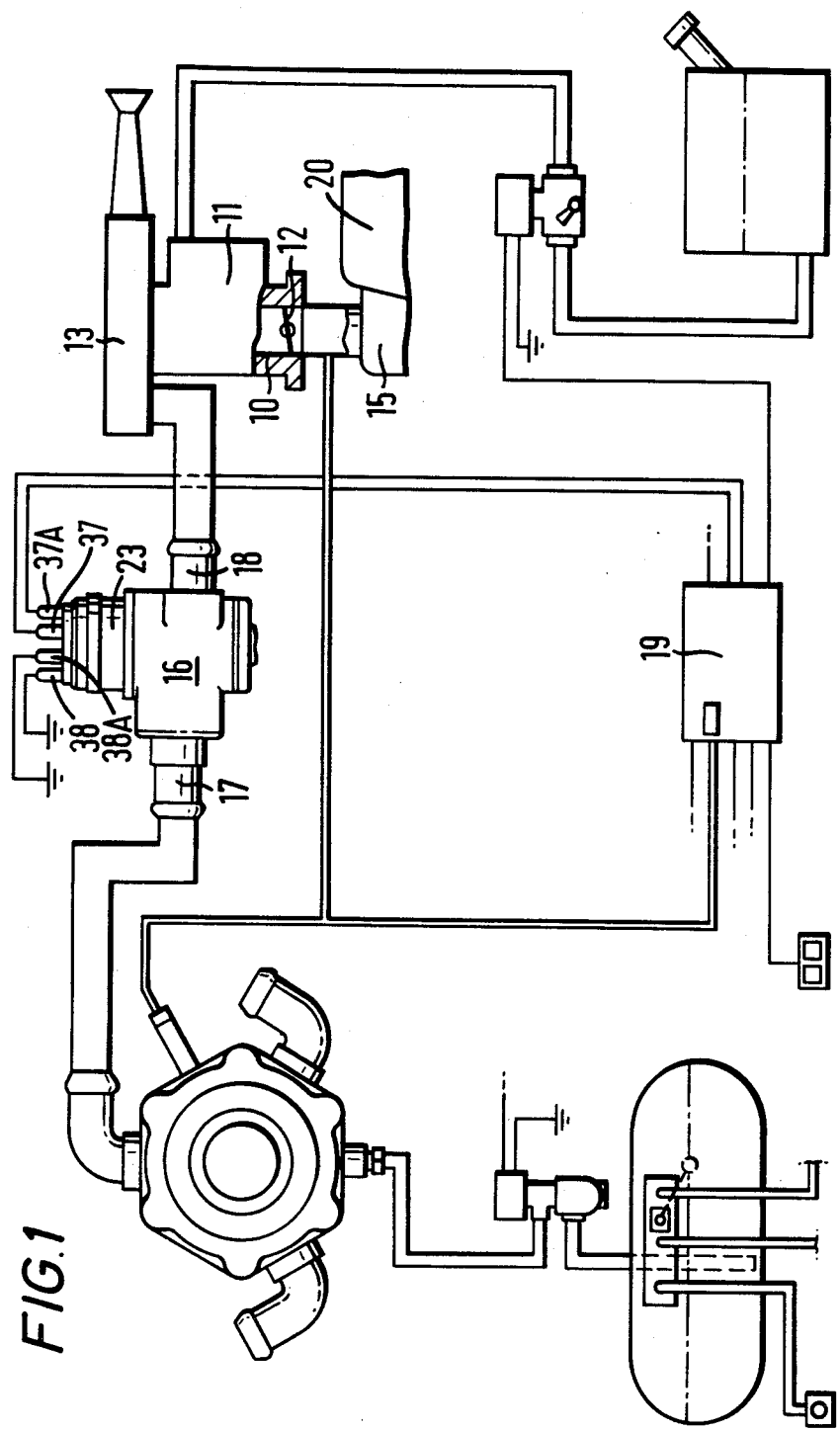
FIG. 1 is a schematic diagram of a petrol/LPG fuel system for a four cylinder engine which incorporates two gaseous LPG injection valves.

FIG. 1 shows a dual fuel supply system which is operable to supply metered quantities of either petrol or gaseous LPG to an induction passage 10 of a carburetter 11 at a location in that induction passage 10 upstream of a driver-operable throttle valve 12 in that passage 10 for mixture in that passage 10 with air which is drawn into the induction passage 10 through an air cleaner 13 by operation of a multi-cylinder internal combustion engine 20 to which the carburetter 11 is fitted, the carburetter induction passage 10 being in communication with the inlet manifold 15 of the engine 20. Hence the flow of air/fuel mixture formed by mixing in the carburetter induction passage 10 of metered quantities of petrol or gaseous LPG supplied to that induction passage 10, with air drawn into that induction passage 10 through the air cleaner 13 is metered by the driver-operable throttle valve 12 and is distributed to the individual cylinders of the group of cylinders with which the engine inlet manifold 15 to which the carburetter induction passage 10 is connected, communicates. Much of the system shown in FIG. 1 is substantially the same as corresponding parts of a similar system which is described in EP-A-0084219. The present invention is concerned with the arrangement of the gaseous LPG injection means of the system shown in FIG. 1 and operation of the gaseous fuel injection means to supply metered quantities of gaseous LPG to the carburetter induction passage 10. Accordingly, the following description will be concerned only with those parts of the system shown in FIG. 1. Reference is directed to EP-A-0084219 for a description of the petrol supply system and the parts of the LPG supply system which operate to feed to the gaseous fuel injection means gaseous LPG at a regulated superatmospheric pressure which varies with changes in the loading of the engine 20.

Gaseous LPG injection means of the system shown in FIG. 1 comprise an assembly 16 of injection valves having a common inlet 17 to which the supply of gaseous LPG at a regulated superatmospheric pressure is fed, and a common outlet 18 which is in conduit communication with the carburetter induction passage 10 through the air cleaner 13. The system shown in FIG. 1 also includes an electronic control unit 19 which is generally similar to the electronic control unit of the system described in EP-A-0084219 in that it is a microprocessor based unit incorporating a memory matrix which is adapted to be addressed by signals indicative of the two main parameters of engine speed and absolute pressure in the inlet manifold of the engine and which stores pulse width information so that its output at any one instant is a pulse width signal which is the stored pulse width signal for the conditions of engine speed and engine inlet manifold absolute pressure prevailing. The electrical control unit 19 incorporates certain features not described in EP-A-0084219 and those differences will be described.

Figure 2:
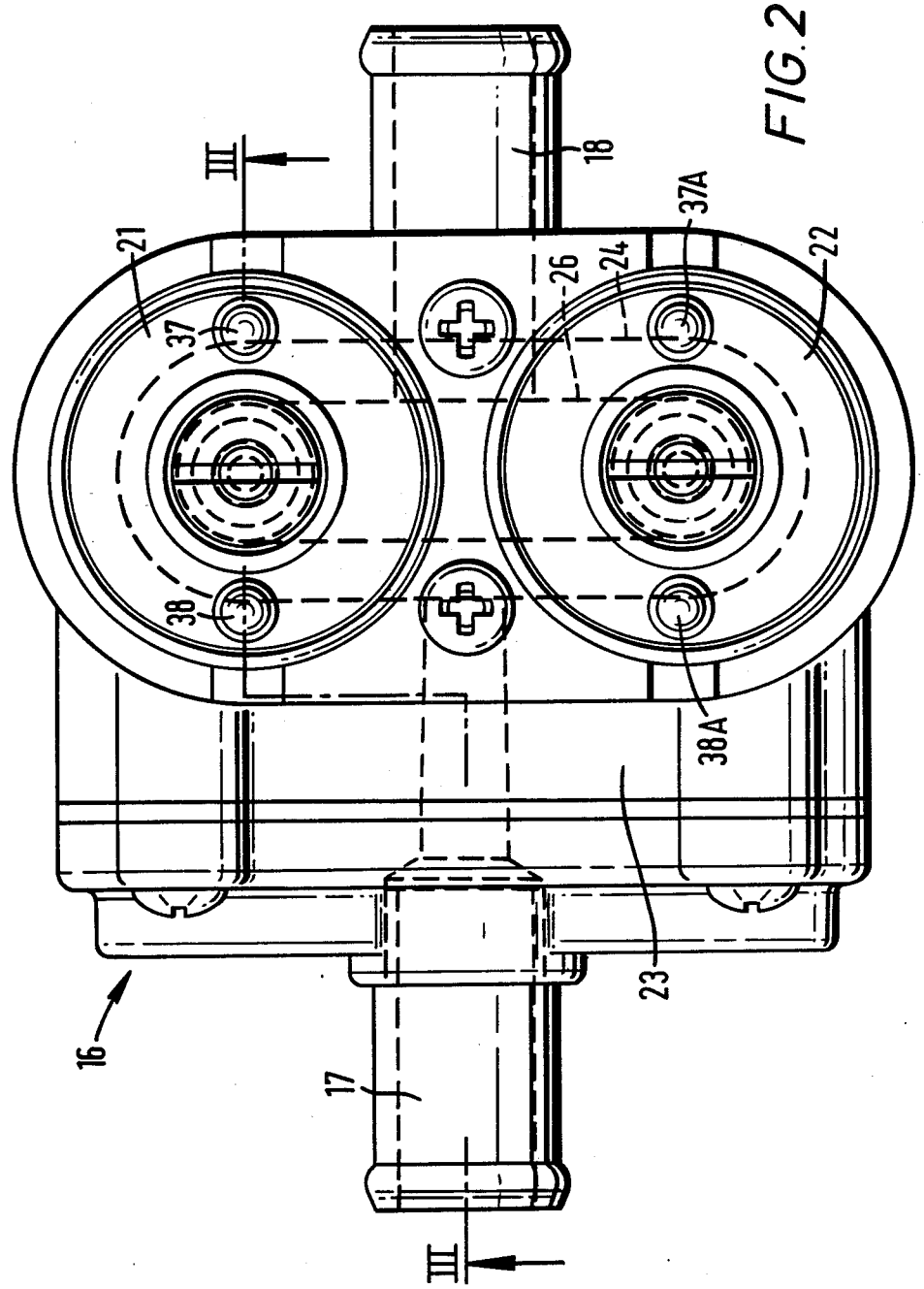
FIG. 2 is a plan view of an assembly of two plunger type fuel injection valves for use in the system shown in FIG. 1.
Figure 3:
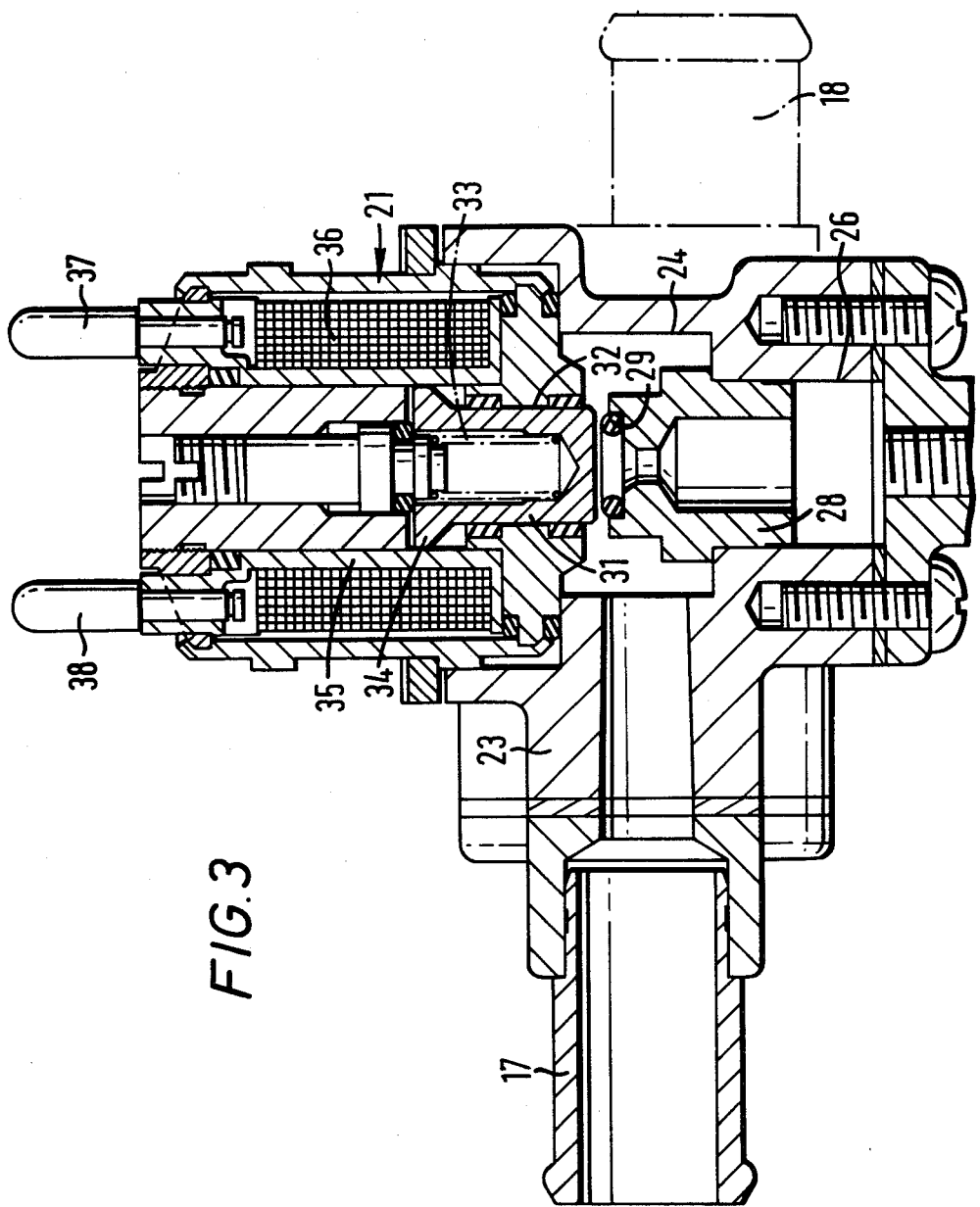
FIG. 3 is a section on the line III—III of FIG. 2.
Figure 4:
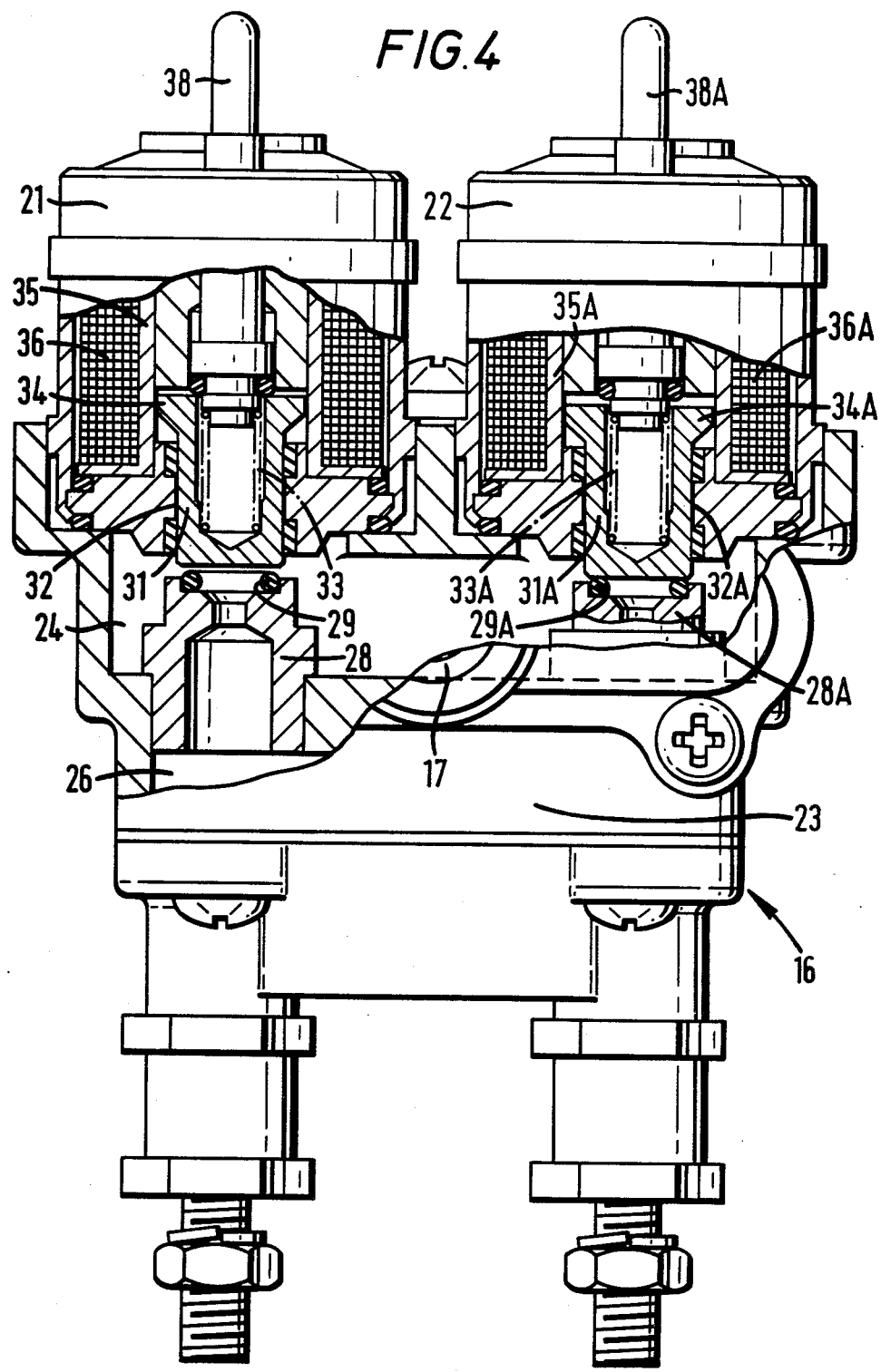
FIG. 4 is a partly sectioned front elevation of the assembly shown in FIGS. 2 and 3 with one valve seated and the other unseated.

FIGS. 2-4 show that the injection valve assembly 16 comprises two electromagnetic injection valves 21 and 22 mounted side by side in a common body 23. Each injection valve 21, 22 controls communication between a chamber 24 formed in the body 23 and a common outlet chamber 26. The common inlet 17 communicates with the chamber 24. The common outlet 18 communicates with the outlet chamber 26.

The construction of the injection valve 21 will be described now with reference to FIG. 3. The construction of the injection valve 22 is similar to that of the injection valve 21 and its parts will be identified in the following description by the reference numerals used to identify the corresponding parts of the injection valve 21, but they will be distinguished from the corresponding parts of the injection valve 21 by the addition of the suffix "A".

Communication between the chamber 24 and the common outlet chamber 26 is via a respective one of two tubular bodies 28 and 28A, each of which is spigotted into a respective bore which extends between the chamber 24 and the outlet chamber 26. The tubular bodies 28 and 28A project into the chamber 24. An O-ring 29, 29A is mounted in an annular shoulder formed at the end of the bore of each tubular body 28, 28A within the chamber 24. The O-ring 29, 29A serves as a valve seat. A plunger 31, 31A is a sliding fit in a respective bore 32, 32A which is formed coaxially with the bore of the respective tubular body 28, 28A in the portion of the wall of the chamber 24 that faces the O-ring 29 and 29A. The end of each plunger 31, 31A nearer the respective tubular body 28, 28A is formed to seat on that O-ring 29, 29A and each plunger 31, 31A is spring loaded by a respective spring 33, 33A to seat on the respective O-ring 29, 29A and thereby close communication between the chambers 24 and 26.

Each plunger 31, 31A is sufficiently long to project from the end of the respective bore 32, 32A that is further from the tubular body 28, 28A, even when it is seated on the O-ring 29. It has a radial flange 34, 34A at its end that is further from the respective tubular body 28, 28A. The radial flange 34, 34A slides within the bore of an annular solenoid core 35, 35A which carries solenoid windings 36, 36A which are connected between terminals 37 and 38, 37A and 38A. One of the terminals, say the terminal 37, 37A is connected to the respective signal output of the electrical control unit 19, and the other terminal 38, 38A is earthed.

During operation of the system, the solenoid winding 36, 36A of the injection valve 21, 21A is energized for the duration of each pulse of the respective pulsed signal received from a respective solenoid drive circuit 39, 39A (see FIG. 5) which is incorporated in the electrical control unit 19. Energisation of the solenoid winding 36, 36A unseats the respective plunger 31, 31A so that, for the duration of each pulse, communication is established between the chamber 24 and the outlet chamber 26 so that a volume of gaseous LPG related to the duration of the energizing pulse is allowed to flow through the bore of the respective tubular body 28, 28A and the chamber to the common outlet 18. The plunger 31, 31A is reseated at the end of each pulse by the action of the respective coil spring 33, 33A.

Figure 5:
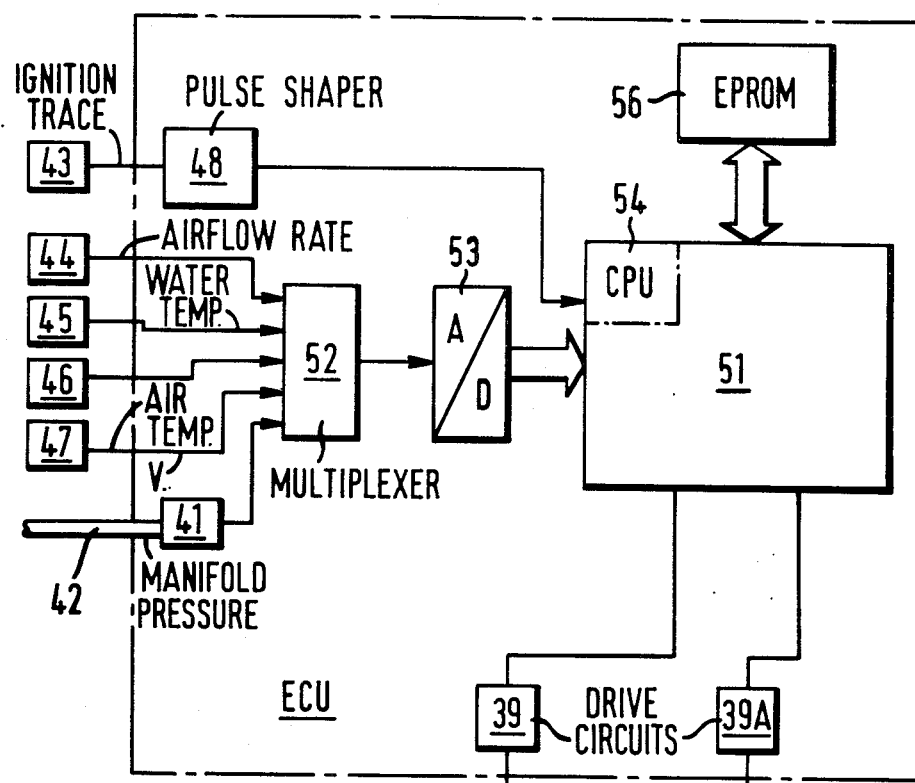
FIG. 5 is an electrical circuit diagram of the electrical control unit and solenoid windings of the valves of the system shown in FIG. 1.

FIG. 5 shows that the electronic control unit receives signal indications of the main operating parameters of the engine 20 from respective transducers.

A pressure transducer 41, which conveniently is mounted in the control unit 19 and is in communication with the inlet manifold 15 by a length of tubing 42, senses pressure in the inlet manifold 15 of the engine and derives therefrom an output signal indicative of the absolute pressure prevailing in the inlet manifold 15 which is a function of engine loading.

An engine speed signal is derived from the vehicle ignition circuit by a suitable device 43, which may be a four vane switch of a Hall effect distributor. An air flow meter 44 responsive to air flow to the engine through the induction passage 10 generates a signal indicative of that air flow. A temperature sensitive device 45 responsive to the engine cooling water temperature provides a signal indicative of that temperature. An air temperature sensor 46 provides a signal indicative of air temperature. A device 47 provides a signal which is indicative of the voltage output of the vehicle battery.

Figure 6:
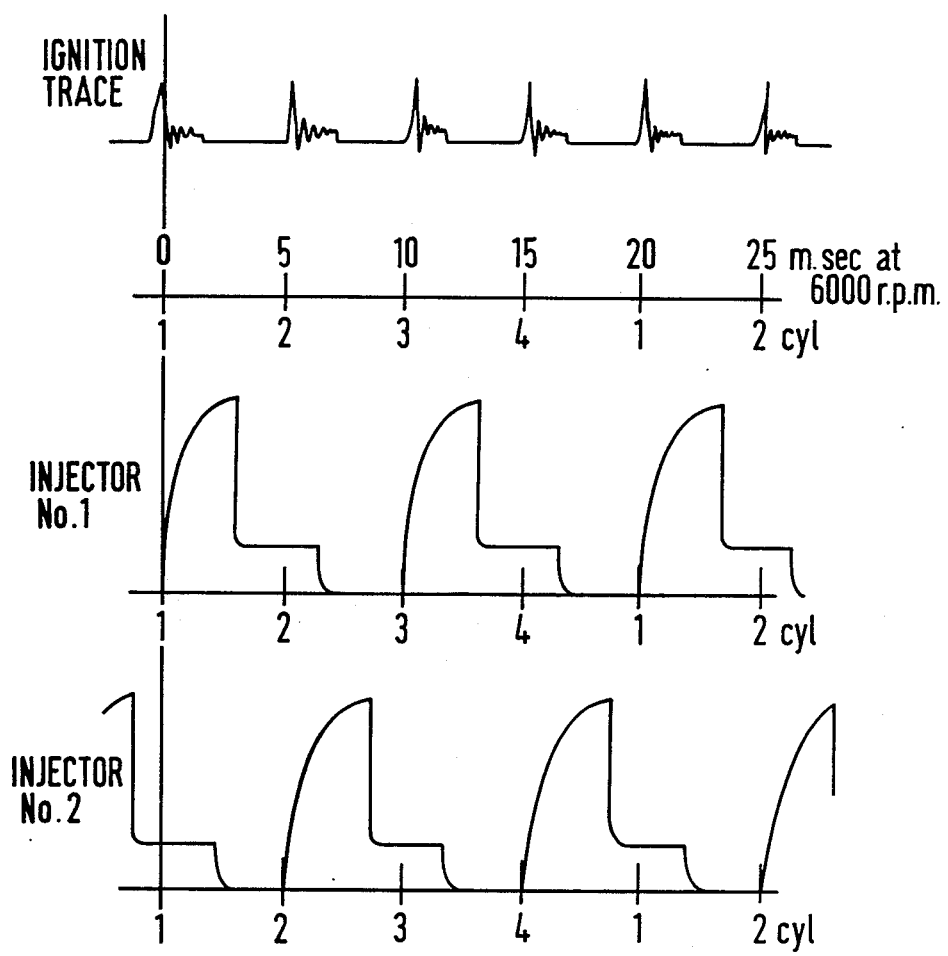
FIG. 6 is a graph illustrating operation of the two injection valves of the system shown in FIG. 1 in synchronism with the ignition firing sequence of the engine.

The engine speed signal derived from the vehicle ignition circuit by the device 43 is shown at the top of FIG. 6 and is fed via a pulse shaper 48 directly to a central processing unit 54 of a microprocessor 51. The signals from the other transducers 41 and 44–47 are fed to an in/out control device of the microprocessor 51 via a multiplexer 52 and an analogue to digital converter (A/D) 53.

The microprocessor 51 is connected to an erasable programmable read only memory (EPROM) 56 which is a memory matrix or look-up table which is operable under the control of the microprocessor 51.

The microprocessor 51 has two signal outputs and is arranged to emit output pulse signals alternately from either output as described more fully in co-pending patent application No. 555,406 filed Nov. 28, 1983. Each output of the microprocessor 51 is connected to a respective one of the two solenoid drive circuits 39 and 39A.

In operation of the microprocessor 51, the EPROM 56 is addressed, under control of the central processing unit 54, by signals indicative of the two main parameters of engine speed and absolute pressure in the inlet manifold of the engine and fuel metering pulses are developed and are emitted from the signal outputs alternately to either of the solenoid drive circuits 39 and 39A.

The output pulses emitted by the microprocessor assembly 51 and transmitted alternately to the solenoid drive circuits 39 and 39A are synchronised with the ignition firing sequence of the engine 20 so that the solenoid winding 36, 36A of each injection valve 21, 22 is energised once for every other ignition firing of the engine. The width of each fuel metering pulse determines the duration of the drive pulse from the solenoid drive circuit 39, 39A and the amount of fuel delivered by each injection.

FIG. 6 shows the relationship between the ignition firing sequence, which is shown at the top, and the solenoid energising pulses emitted by the respective solenoid drive circuits 39, 39A. Each solenoid energising pulse has a rising leading edge leading to a drive current of approximately 4 amps which is effective to displace the valve plunger 31, 31A from its seat 29, 29A, followed by a steady portion of approximately 1 amp during which the valve plunger 31, 31A is in its open position. FIG. 4 shows the valve plunger 31 unseated while the valve plunger 31A is seated.

Although the solenoid energising pulses cause the valves to open alternately at equivalent points in the engine cycle on alternate cylinder firings, it will be understood from FIG. 6 that under certain engine operating conditions, e.g. at higher engine speeds, one valve may remain open while the other has opened.

It will be understood that the two injection valves 21 and 22 are operated sequentially by the electrical control unit 19 so that the pulsed outputs from those two valves are collected in the common outlet chamber 26. As a result the injection valve assembly 16 emits gaseous LPG from its common outlet 18 at a frequency which is synchronised with engine speed. The resultant gaseous LPG supply may be a pulsed output at lower engine speeds and may merge into a substantially continuous stream at higher engine speeds. The output of gaseous LPG from the common outlet 18 is conveyed to the carburettor induction passage 10 and is introduced to the interior of the induction passage 10 through the air cleaner 13 whereby it is presented to the air flow through the induction passage 10 to the engine as a single supply of gaseous fuel.

The injection valve assembly 16 is conveniently situated to avoid excessive heating of the injection valves and it is conveniently mounted so as to minimise operating noise.

The memory matrix 56 incorporated in the electrical control unit 19 conveniently consists of two hundred and fifty six values of pulse width in a range of 0 to 10 milliseconds. Between each value location, a process of arithmetic linear interpolation is to be applied in sixteen steps. The engine speed address steps are applied to the memory matrix 56 on a geometric series to provide suitable sensitivity for low values. The engine load address may be arithmetic steps.

Figure 7:
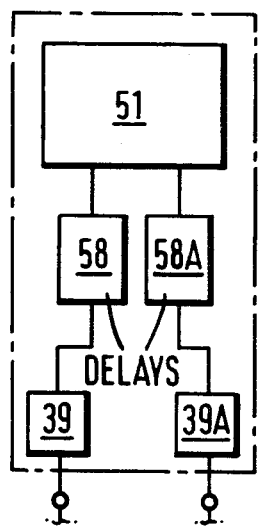
FIGS. 7 and 8 illustrate modifications of the circuit shown in FIG. 5.

The moment of injection may be phase delayed after each instant of ignition firing by the inclusion of a delay device 58, 58A, between the microprocessor 51 and each solenoid drive circuit 39, 39A as shown in FIG. 7.

Figure 8:
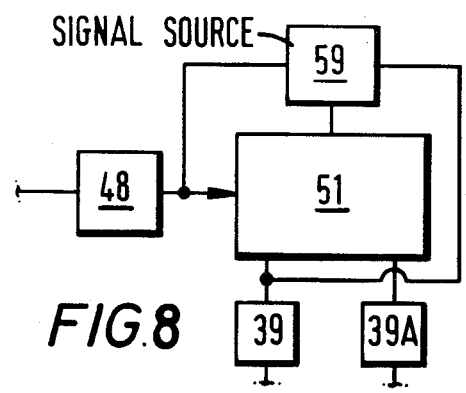

Various means for modifying the pulse width output signal from the microprocessor assembly 51 may be provided in the electrical control unit 19 for various reasons. In order to provide an overrun fuel cut-off for fuel economy and to reduce the exhaust emission, zero values may be placed in the matrix at engine load addresses below a predetermined minimum absolute manifold pressure, say 0.2 bar. An independent pulse width generator 59 (See FIG. 8) responsive to the ignition pulse signal, or other engine speed signal, may be used to give very large pulse widths in the region of 75 milliseconds synchronised to the engine cranking speed for engine cranking. The values may need to be modified with engine coolant temperature. Also provision may be made for protecting against excessive gas being delivered during cranking in the event of the engine failing to start. This may be achieved by incorporating in a signal source that would serve as the generator 59, means for reducing the cranking pulse width from the initial large pulse width of say 75 milliseconds to zero over a period of twenty seconds cranking The two injection valves 21 and 22 need not be mounted side by side as shown in FIGS. 2 and 4. They may be mounted substantially coaxially so that they inject towards one another, or in a wee arrangement so that they inject along convergent paths. Alternatively, they may be staggered, being displaced laterally relative to one another and arranged to inject in opposite directions along parallel paths into passages which are interconnected.

The system described above with reference to the drawings has been designed for a four cylinder engine. To facilitate the application of the system to engines having a larger number of cylinders, it may be desirable to provide more than two injection valves and to arrange for that greater number of injection valves to be operated in sequence in synchronism with the engine.

Figure 9:
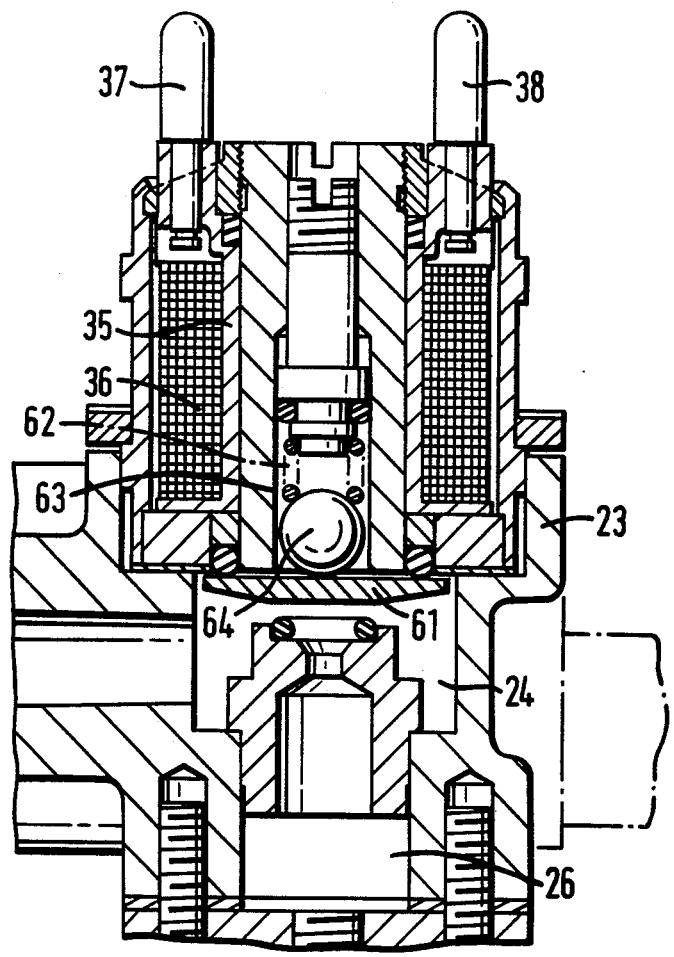
FIG. 9 is a fragmentary view similar to the corresponding part of FIG. 3 showing an alternative form of gaseous LPG injection valve for use as one of the injection valves in the system shown in FIG. 1.

FIG. 9 illustrates an alternative form of injection valve for use instead of the plunger type injection valve described above with reference to FIGS. 2 to 4. As in the plunger type injection valve 21, communication between the chamber 24 and the outlet chamber 26 is through the bore of a tubular body 28. FIG. 9 shows that the bore is stepped, reducing in diameter in the downstream direction whereas the diameter of the stepped bore of the tubular body 28 of the plunger type injection valve 21 increases in the downstream direction.

The valve member of the injection valve shown in FIG. 9 is a disc 61 which has a central flat surface of a larger diameter than the diameter of the O-ring 29 with which it co-operates to close communication between the chambers 24 and 26.

A spring 62, which is located in a bore 63 formed in the body 23 coaxially with the bore of the tubular body 28, acts through a ball 64 to urge the disc 61 to seat on the O-ring 29 and close communication between the chamber 24 and the chamber 26. The ball 64 is also located in the bore 63. The disc 61 is unseated, as shown in FIG. 9, when the solenoid winding 36 is energized by a pulse signal received from the electrical control unit 19.

The moving parts of the valve shown in FIG. 9, viz. the disc 61 and the ball 64, may be lighter than corresponding parts of the plunger type valve 21 so that the disc type valve may be operated at a higher frequency than the plunger type valve.

Use of such a multiple injection valve assembly which is operated sequentially in synchronism with operation of an engine and which has its metered pulsed outputs collected and fed as a single supply for presentation to a stream of air which is inducted into the engine, is not limited in its application to dual petrol/LPG systems. It is applicable to any gaseous fuel system for a multi-cylinder i.c. engine where the metered supply of gaseous fuel is mixed with a stream of air which is inducted to an i.c. engine through an induction passage having a driver operable throttle valve in it for controlling flow of the air/fuel mixture to the engine.

I claim:

1. An air/fuel induction system for a multi-cylinder internal combustion engine comprising an air/fuel induction passage, a driver-operable throttle valve in the induction passage for controlling flow of air/fuel mixture to cylinders of the engine and a gaseous fuel system comprising a plurality of on/off injection valves each operable to control gaseous fuel flow from a common inlet chamber to a common outlet chamber by opening and shutting a respective orifice located between said inlet chamber and outlet chamber, the quantity of gaseous fuel injected by each valve being determined by the frequency of opening and the duration of each opening of the orifice, gaseous fuel supply means operable to supply gaseous fuel to said common inlet chamber, said common inlet chamber being immediately adjacent to and extending between said plurality of injection valves for selective communication with said common outlet chamber, and electrical control means responsive to certain operating conditions of the engine and operable to control operation of said on/off injection valves in accordance with those conditions so that they are operated sequentially and in synchronism with operation of the engine whenever the engine is running under its own power whereby each of said on/off injection valves emits a metered, pulsed output of gaseous fuel which is presented to a stream of air flowing through the induction passage through said common outlet chamber into which all said on/off injection valves are adapted to inject their metered, pulsed output of gaseous fuel directly, a conduit being provided by which said common outlet chamber is in conduit communication with said air/fuel induction passage whereby the separate metered, pulsed outputs of gaseous fuel injected directly into said common outlet chamber sequentially by said plurality of on/off injection valves are collected in said common outlet chamber and fed to said air/fuel induction passage by said conduit as a single substantially continuous supply of gaseous fuel.

2. A system according to claim 1, wherein the electrical control means comprise a microprocessor incorporating a memory matrix, various transducers responsive to selected operating conditions of the engine including engine speed and engine loading, the microprocessor having inputs adapted to receive signals from each transducer and arranged such that the memory matrix is addressed by signals representative of the parameters of engine speed and engine loading, and means whereby successive output signals derived from information stored in the memory matrix are directed alternately to the energising means of each injector valve, which is electromagnetically actuable, whereby to effect the sequential operation of the injector valves.

3. A system according to claim 1, wherein the electrical control means are adapted to effect a fuel cut-off when engine overrun conditions are sensed.

4. A system according to claim 3, wherein the electrical control means are adapted to effect such a fuel cut-off by incorporation of zero values in the memory matrix at locations which would be addressed by signals indicative of engine inlet manifold pressure conditions below a certain minimum manifold pressure.

5. A system according to claim 1, wherein the electrical control means are arranged to effect operation of each injector valve at a predetermined time interval after the instant of each ignition firing.

6. A system according to claim 1, wherein the electrical control means include independent pulse width generating means adapted to generate a large pulse width for effecting operation of the injector valves for engine cranking.

7. A system according to claim 6, wherein the independent pulse width generating means are adapted to reduce the pulse width signals emitted by the independent pulse width generating means from the initial large pulse width to zero over a predetermined time period.

8. A system according to claim 1, wherein each injector valve is a plunger type injector valve.

9. A system according to claim 1, wherein each injector valve is a disc type injector valve.

10. A system according to claim 1, wherein the electrical control means are adapted to open each valve before the other valve is closed during certain engine operating conditions.

11. The air/fuel induction system according to claim 1, wherein said injection valves function to meter said gaseous fuel.

12. An air/fuel induction system for a multicylinder internal combustion engine comprising an air/fuel induction passage, a driver-operable throttle valve in the induction passage for controlling flow of air/fuel mixture to cylinders of the engine and a gaseous fuel system comprising a plurality of on/off injection valves each operable to control gaseous fuel flow by opening and shutting a respective orifice, the quantity of gaseous fuel injected by each valve being determined by the frequency of opening and the duration of each opening of the orifice, said injection valves functioning to meter said quantity of gaseous fuel injected, gaseous fuel supply means operable to supply gaseous fuel to a common inlet chamber surrounding said injection valves the common inlet chamber being located upstream of said valves, said common inlet chamber being in direct communication with both of said respective orifices of said plurality of on/off injection valves, and electrical control means responsive to certain operating conditions of the engine and operable to control operation of said on/off injection valves in accordance with those conditions so that they are operated sequentially and in synchronism with operation of the engine whenever the engine is running under its own power whereby each of said on/off injection valves emits a metered, pulsed output of gaseous fuel which is presented to a stream of air flowing through the induction passage, wherein there is provided a common outlet chamber into which all said on/off injection valves are adapted to inject their metered, pulsed output of gaseous fuel directly, and a conduit by which said common outlet chamber is in conduit communication with said air/fuel induction passage whereby the separate metered, pulsed outputs of gaseous fuel injected directly into said common outlet chamber sequentially by said plurality of on/off injection valves are collected in said common outlet chamber and are fed to said air/fuel induction passage by said conduit as a single essentailly continuous supply of gaseous fuel.

* * * * *